US012699502B2

(12) United States Patent
Chen

(10) Patent No.: US 12,699,502 B2
(45) Date of Patent: Aug. 4, 2026

(54) METHOD AND APPARATUS FOR PROCESSING INCOMING CALL DISPLAY INTERFACE AND ELECTRONIC DEVICE

(71) Applicant: VIVO MOBILE COMMUNICATION CO., LTD., Guangdong (CN)

(72) Inventor: Sisi Chen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 224 days.

(21) Appl. No.: 18/653,112

(22) Filed: May 2, 2024

(65) Prior Publication Data

US 2024/0272777 A1      Aug. 15, 2024

Related U.S. Application Data

(63) Continuation of application No. PCT/CN2022/132861, filed on Nov. 18, 2022.

(30) Foreign Application Priority Data

Nov. 24, 2021      (CN) .......................... 202111403039.4

(51) Int. Cl.
*G06F 3/0484* (2022.01)
*H04W 68/00* (2009.01)
(52) U.S. Cl.
CPC .......... *G06F 3/0484* (2013.01); *H04W 68/00* (2013.01)
(58) Field of Classification Search
CPC .............................. H04W 68/00; G06F 3/0484
See application file for complete search history.

(56) References Cited

U.S. PATENT DOCUMENTS

| | | | | |
|---|---|---|---|---|
| 9,110,589 | B1 * | 8/2015 | Yaksick | G06F 3/04886 |
| 9,807,228 | B1 * | 10/2017 | Chiang | H04M 1/72469 |
| 10,771,606 | B2 * | 9/2020 | Yang | H04M 1/6066 |
| 10,951,756 | B1 * | 3/2021 | Silverstein | H04M 3/436 |
| 11,513,604 | B2 * | 11/2022 | Jain | G06F 1/1671 |
| 11,811,968 | B2 * | 11/2023 | Matias | H04M 3/436 |
| 2012/0052920 | A1 * | 3/2012 | Kobayashi | G06F 3/0482 |
| | | | | 455/566 |

(Continued)

FOREIGN PATENT DOCUMENTS

| | | |
|---|---|---|
| CN | 303439619 S | 11/2015 |
| CN | 105847588 A | 8/2016 |

(Continued)

OTHER PUBLICATIONS

Second European Office Action for European Patent Application No. 22897720.3 mailed Mar. 4, 2026, 6 pages.

*Primary Examiner* — Tadesse Hailu

(74) *Attorney, Agent, or Firm* — Price Heneveld LLP

(57) ABSTRACT

This application discloses a method and apparatus for processing an incoming call display interface and an electronic device. The method includes: displaying an incoming call display interface, where the incoming call display interface includes a target element, and the target element is displayed with a first effect; receiving a first input from a user; and in response to the first input, displaying the target element with a second effect in a case that the first input indicates answering an incoming call, and displaying the target element with a third effect in a case that the first input indicates rejecting an incoming call.

17 Claims, 10 Drawing Sheets

(56)  References Cited

U.S. PATENT DOCUMENTS

| | | | | | |
|---|---|---|---|---|---|
| 2013/0222268 | A1* | 8/2013 | Greisson | ............... | H04M 1/576 |
| | | | | | 345/173 |
| 2013/0285925 | A1* | 10/2013 | Stokes | .................... | H04M 1/67 |
| | | | | | 345/173 |
| 2013/0295898 | A1 | 11/2013 | Kader | | |
| 2013/0324094 | A1* | 12/2013 | Unetich | .................. | H04M 1/64 |
| | | | | | 455/414.1 |
| 2013/0331073 | A1* | 12/2013 | Balan | ...................... | H04W 4/16 |
| | | | | | 455/415 |
| 2014/0292768 | A1* | 10/2014 | Tobin | .................... | G06F 3/0488 |
| | | | | | 345/473 |
| 2015/0248389 | A1* | 9/2015 | Kahn | ...................... | H04L 51/18 |
| | | | | | 715/230 |
| 2015/0304485 | A1* | 10/2015 | Yao | ..................... | H04M 1/7243 |
| | | | | | 455/418 |
| 2016/0142533 | A1* | 5/2016 | Yoo | ........................ | H04M 1/575 |
| | | | | | 455/567 |
| 2016/0343034 | A1* | 11/2016 | Green | ...................... | H04W 4/60 |
| 2018/0191895 | A1* | 7/2018 | Zhao | ........................ | H04W 4/16 |
| 2018/0247440 | A1 | 8/2018 | Heo et al. | | |
| 2018/0255177 | A1* | 9/2018 | Scott | ..................... | H04M 3/436 |
| 2019/0278437 | A1 | 9/2019 | Yaksick et al. | | |
| 2021/0400131 | A1* | 12/2021 | Chang | ................. | G06F 3/04886 |

FOREIGN PATENT DOCUMENTS

| | | | |
|---|---|---|---|
| CN | 106791201 | A | 5/2017 |
| CN | 107819952 | A | 3/2018 |
| CN | 108111680 | A | 6/2018 |
| CN | 108605226 | A | 9/2018 |
| CN | 109040472 | A | 12/2018 |
| CN | 114095611 | A | 2/2022 |
| WO | 2016079539 | A1 | 5/2016 |

* cited by examiner

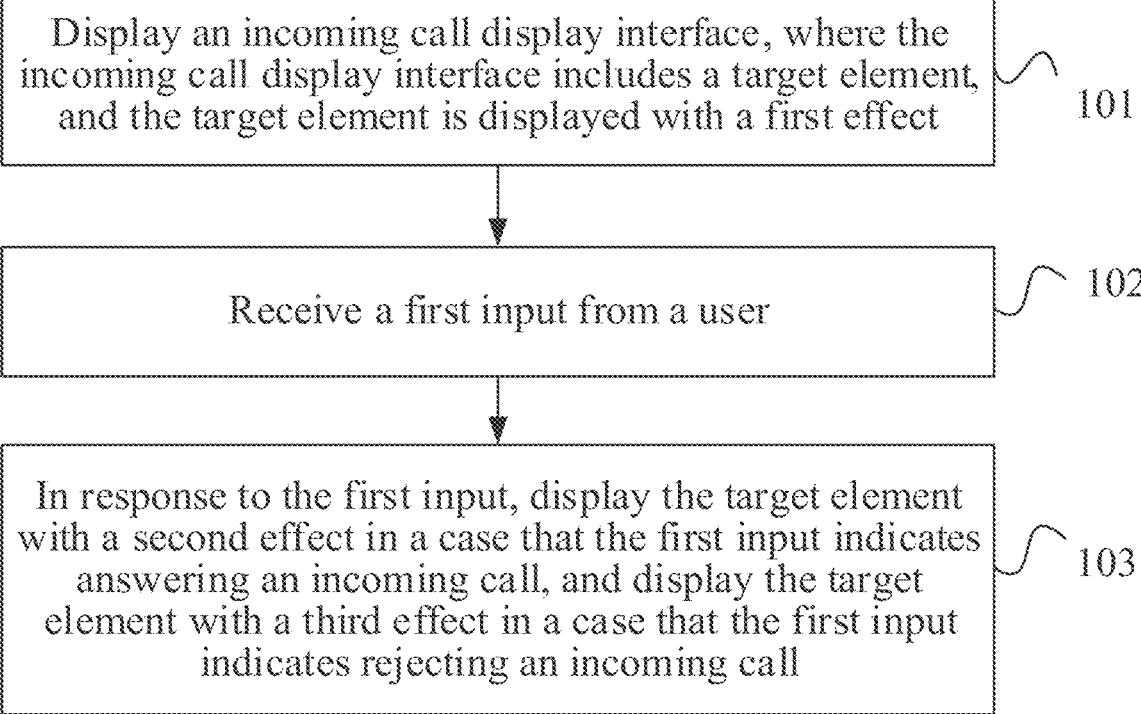

Display an incoming call display interface, where the incoming call display interface includes a target element, and the target element is displayed with a first effect — 101

Receive a first input from a user — 102

In response to the first input, display the target element with a second effect in a case that the first input indicates answering an incoming call, and display the target element with a third effect in a case that the first input indicates rejecting an incoming call — 103

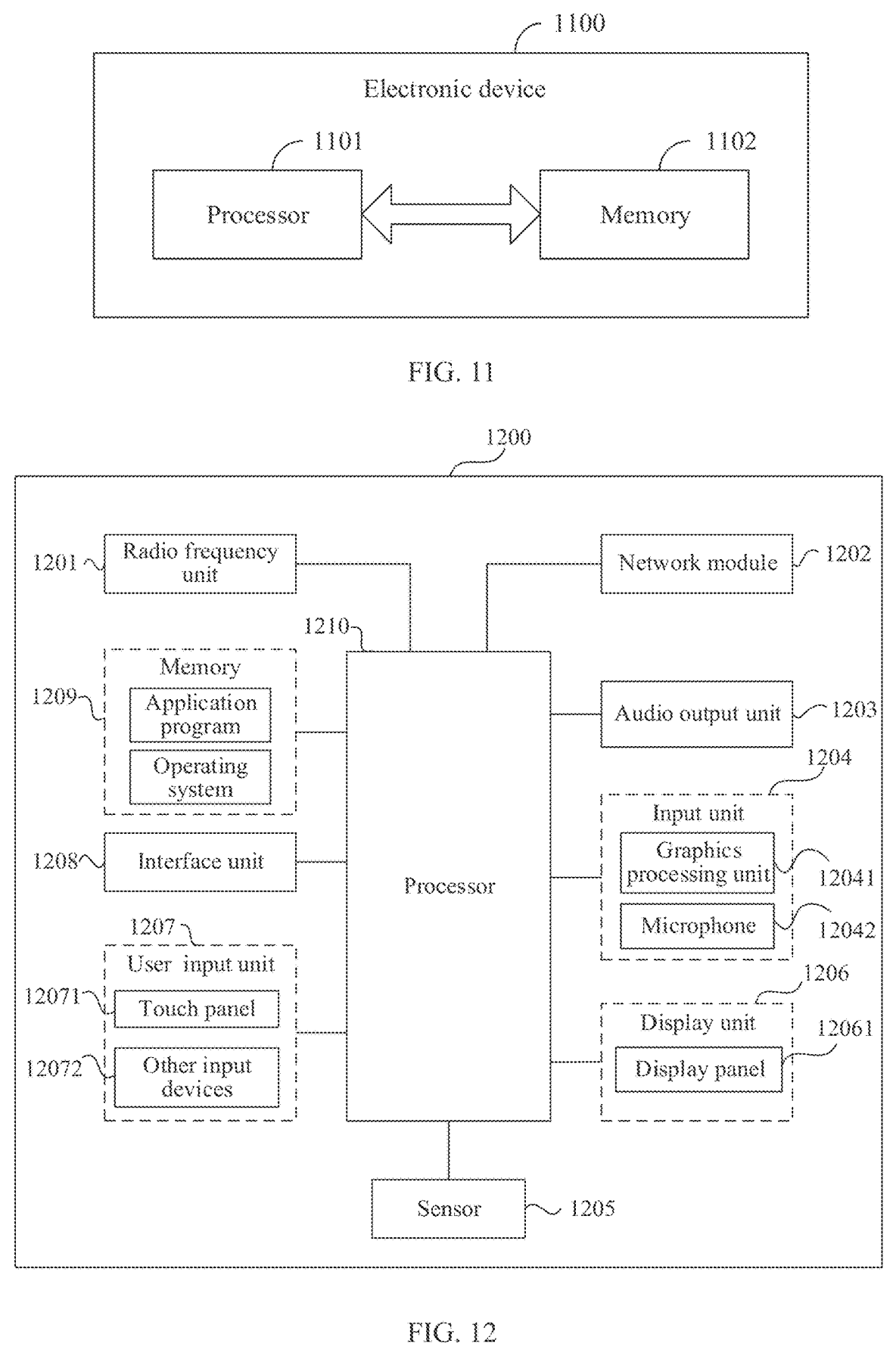

Electronic device

1101

Processor

1102

Memory

1201 — Radio frequency unit

Network module — 1202

1210

1209 — Memory

Application program

Operating system

Audio output unit — 1203

1204

1208 — Interface unit

Processor

Input unit

Graphics processing unit — 12041

Microphone — 12042

1207

User input unit

12071 — Touch panel

12072 — Other input devices

1206

Display unit — 12061

Display panel

Sensor — 1205

FIG. 12

METHOD AND APPARATUS FOR PROCESSING INCOMING CALL DISPLAY INTERFACE AND ELECTRONIC DEVICE

CROSS-REFERENCE TO RELATED APPLICATIONS

This application is a Bypass Continuation Application of PCT International Application No. PCT/CN2022/132861 filed on Nov. 18, 2022, which claims priority to Chinese Patent Application No. 202111403039.4, filed in China on Nov. 24, 2021, which are incorporated herein by reference in their entireties.

TECHNICAL FIELD

This application belongs to the field of electronic device technology and specifically relates to a method and apparatus for processing an incoming call display interface and an electronic device.

BACKGROUND TECHNOLOGY

Currently, dynamic backgrounds for incoming calls are mostly default backgrounds, or user-customized videos that play a default fixed segment of video, resulting in a problem of monotonous incoming call background display effects.

SUMMARY

The purpose of the embodiments of this application is to provide a method and apparatus for processing an incoming call display interface and an electronic device.

According to a first aspect, an embodiment of this application provides a method for processing an incoming call display interface, including:

displaying an incoming call display interface, where the incoming call display interface includes a target element, and the target element is displayed with a first effect;

receiving a first input from a user; and in response to the first input, displaying the target element with a second effect in a case that the first input indicates answering an incoming call, and displaying the target element with a third effect in a case that the first input indicates rejecting an incoming call.

According to a second aspect, an embodiment of this application provides an apparatus for processing an incoming call display interface, including:

a first display module configured to display an incoming call display interface, where the incoming call display interface includes a target element, and the target element is displayed with a first effect;

a first receiving module configured to receive a first input from a user; and a first response module configured to: in response to the first input, display the target element with a second effect in a case that the first input indicates answering an incoming call, and display the target element with a third effect in a case that the first input indicates rejecting an incoming call.

According to a third aspect, an embodiment of this application provides an electronic device, where the electronic device includes a processor and a memory, the memory can store a program or instructions capable of running on the processor, and when the program or instructions are executed by the processor, the steps of the method according to the first aspect are implemented.

According to a fourth aspect, an embodiment of this application provides a readable storage medium, where the readable storage medium stores a program or instructions, and when the program or instructions are executed by a processor, the steps of the method according to the first aspect are implemented.

According to a fifth aspect, an embodiment of this application provides a chip, where the chip includes a processor and a communication interface, the communication interface is coupled to the processor, and the processor is configured to run a program or instructions so as to implement the method according to the first aspect.

According to a sixth aspect, an embodiment of this application provides a computer program product, where the program product is stored in a storage medium, and the program product is executed by at least one processor so as to implement the method according to the first aspect.

According to a seventh aspect, an embodiment of this application provides an electronic device, where the electronic device is configured to execute the method as described in the first aspect.

DESCRIPTION OF THE DRAWINGS

FIG. 1 is a flowchart of a method for processing an incoming call display interface according to an embodiment of this application;

FIG. 11 is a structural block diagram of an electronic device according to an embodiment of this application; and FIG. 12 is a schematic diagram of a hardware structure of an electronic device according to an embodiment of this application.

DETAILED DESCRIPTION OF EMBODIMENTS

The technical solutions in the embodiments of this application will be clearly described below in conjunction with the accompanying drawings in the embodiments of this application. Obviously, the described embodiments are only a part of the embodiments of this application, not all of them. Based on the embodiments in this application, all other embodiments obtained by those skilled in the art without creative efforts fall within the protection scope of this application.

The terms "first", "second", and the like in the specification and claims of this application are used to distinguish similar objects and are not used to describe a specific order or sequence. It should be understood that the data used in this way can be exchanged under appropriate circumstances so that the embodiments of this application can be implemented in an order other than those illustrated or described here, and the objects distinguished by "first", "second", and the like are generally a class and do not limit the number of objects; for example, the first object can be one or more. In addition, in the specification and claims, "and/or" means at least one of the associated objects, and the character "/" generally indicates a "or" relationship between the associated objects before and after.

The method and apparatus for processing an incoming call display interface and electronic device provided by the embodiments of this application will be described in detail below in conjunction with the specific embodiments and their application scenarios.

As shown in FIG. 1, this application provides a method for processing an incoming call display interface, which specifically includes the following steps.

Step 101. Display an incoming call display interface, where the incoming call display interface includes a target element, and the target element is displayed with a first effect.

Figure 7:
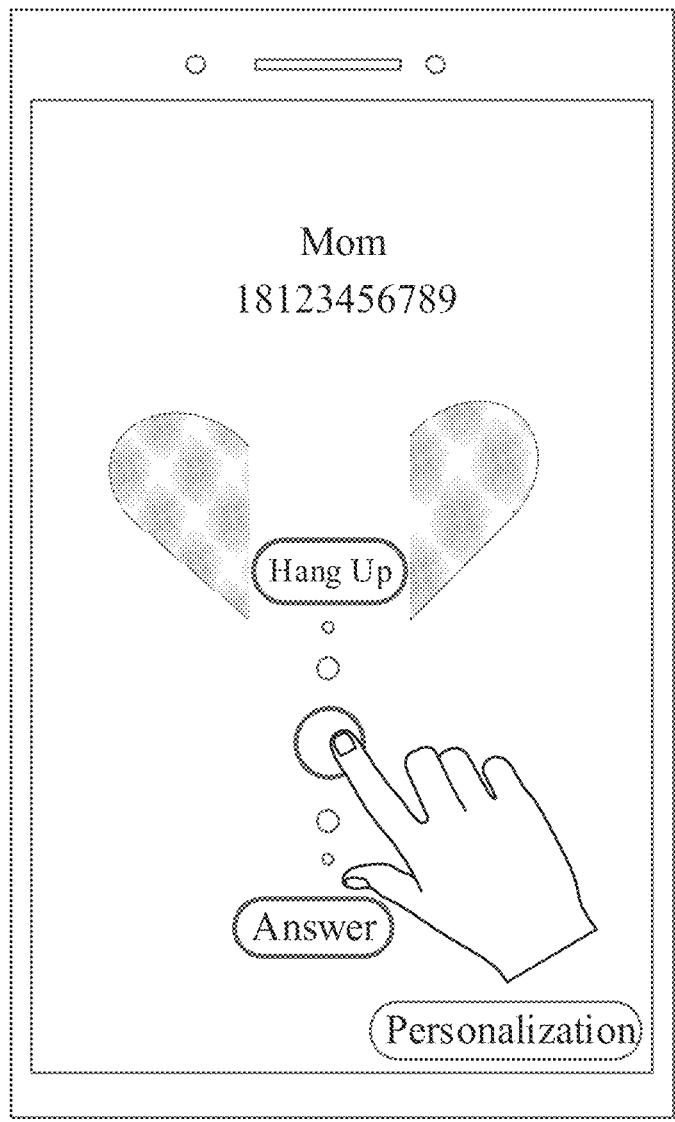
FIG. 7 is a second schematic diagram of an incoming call display interface according to an embodiment of this application.

The target element includes one or more graphic elements. For example, as shown in FIG. 7, the target element shown is two half-heart shapes.

Step 102. Receive a first input from a user.

In this step, the first input is used to trigger answering or rejecting an incoming call; and the first input can be an input from a user on the incoming call display interface or an input on the answer or hang-up button;

The first input is a preset input, which can include but is not limited to at least one of tapping input, pressing input, press-and-hold input, pinching input, dragging input, sliding input, and swiping input, that is, the first input can be one of the above inputs, or a combination input of two or more of the above inputs.

Figure 2:
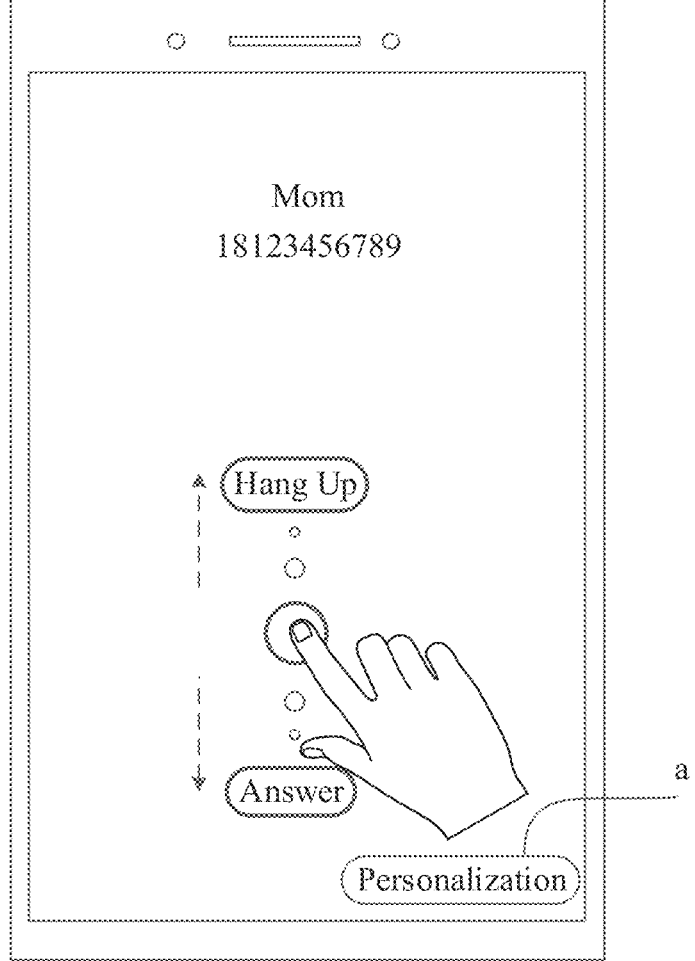
FIG. 2 is a first schematic diagram of an incoming call display interface according to an embodiment of this application.

For example, as shown in FIG. 2, FIG. 2 is a schematic diagram of an incoming call display interface. When the first input is used to trigger rejecting an incoming call, it can be a sliding input that moves the slider button to the "Hang-up" icon (as indicated by the upward dashed arrow in FIG. 2); when the first input is used to trigger answering an incoming call, it can be a sliding input that moves the slider button to the "Answer" icon (as indicated by the downward dashed arrow in FIG. 2).

Step 103. In response to the first input, display the target element with a second effect in a case that the first input indicates answering an incoming call, and display the target element with a third effect in a case that the first input indicates rejecting an incoming call.

In this step, the first effect, second effect, and third effect are different, which can specifically include: the target element having different colors, shapes, or positions.

In one embodiment, the first effect is determined based on the second effect and the third effect.

Optionally, the first effect is between the second effect and the third effect.

For example, as shown in FIG. 7, when the target element corresponds to the first effect, it is located at the first position on the incoming call display interface, which may be between the second position and the third position; where, the second position is the position of the target element on the incoming call display interface when corresponding to the second effect, and the third position is the position of the graphic element on the incoming call display interface when corresponding to the third effect.

Figure 8:
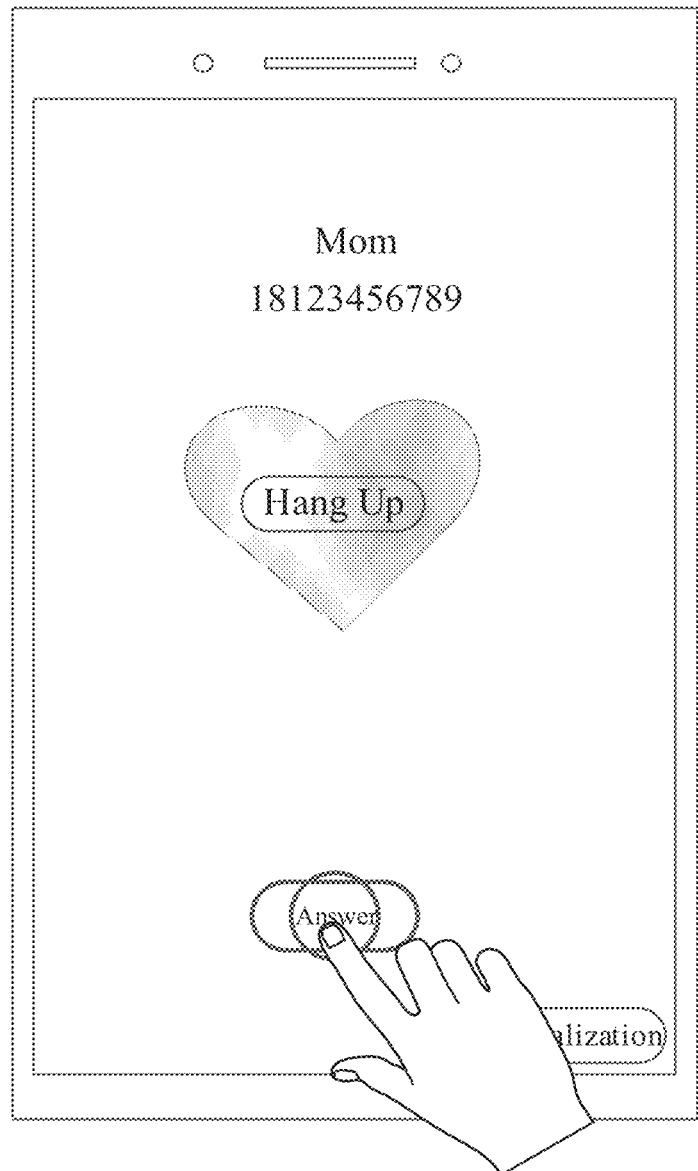
FIG. 8 is a third schematic diagram of an incoming call display interface according to an embodiment of this application.
Figure 9:
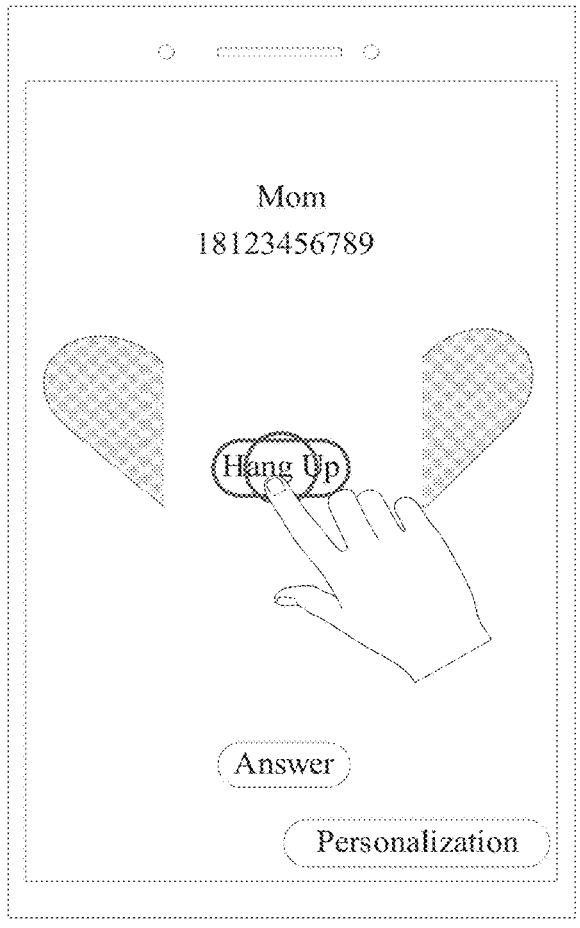
FIG. 9 is a fourth schematic diagram of an incoming call display interface according to an embodiment of this application.

As can be seen from FIGS. 7 to 9, the first effect, second effect, and third effect all include two half-heart shapes, corresponding to the combination of two half-heart shapes in different positions. It should be noted that the heart element and half-heart element are only examples, and in specific implementations, the shape and number of graphic elements can be selected and set by the user, and are not limited to this.

In this embodiment, by displaying the incoming call display interface and displaying the target element on the incoming call display interface, the target element is displayed with the first effect; receiving a first input from a user; and in response to the first input, displaying the target element with a second effect in a case that the first input indicates answering an incoming call, and displaying the target element with a third effect in a case that the first input indicates rejecting an incoming call, it is possible to enrich the display effect of the incoming call display background and increase interest.

To further increase the display effect and better visual experience, in one embodiment, step 103 may specifically include: in response to the first input, displaying a process animation of the target element changing from the first effect to the second effect, or from the first effect to the third effect, according to a preset motion path, where the preset motion path is the motion path of the target element.

For example, as shown in FIGS. 7 to 9, when the user performs a sliding answering operation, the distance between the two half-hearts in the incoming call display background gradually shortens until the slider is completely slid to the answer button, the background image changes to the second effect set by the user (as shown in the heart shape in FIG. 8); when the user performs a sliding hang-up operation, the distance between the two half-hearts in the background gradually increases until the slider is completely slid to the hang-up button, the background image changes to the third effect set by the user (as shown in FIG. 9).

In one embodiment, before displaying the incoming call display interface, the method further includes:

displaying a first interface, where the first interface is used for setting the incoming call display interface, the first interface includes a first control, and the first control is used for indicating setting the incoming call display interface where incoming calls are answered or rejected;

in a case that an input for the first control is received, receiving a second input for a first image in N images displayed on the first interface; and in response to the second input, displaying the first image on the first interface, where the target element corresponds to the first image.

Specifically, the first interface is used for setting the target element to the second effect or the third effect. Before the displaying an incoming call display interface, the method further includes: receiving an input operation for the target control; and in response to the input operation, displaying the first interface. For example, the target control can be the "Personalization" button b on the incoming call display interface as shown in FIG. 2 or a setting control in the contact interface; or before the displaying the first interface, the method can further include: receiving an input operation for an incoming call display interface of a contact to display the first interface.

Figure 6:
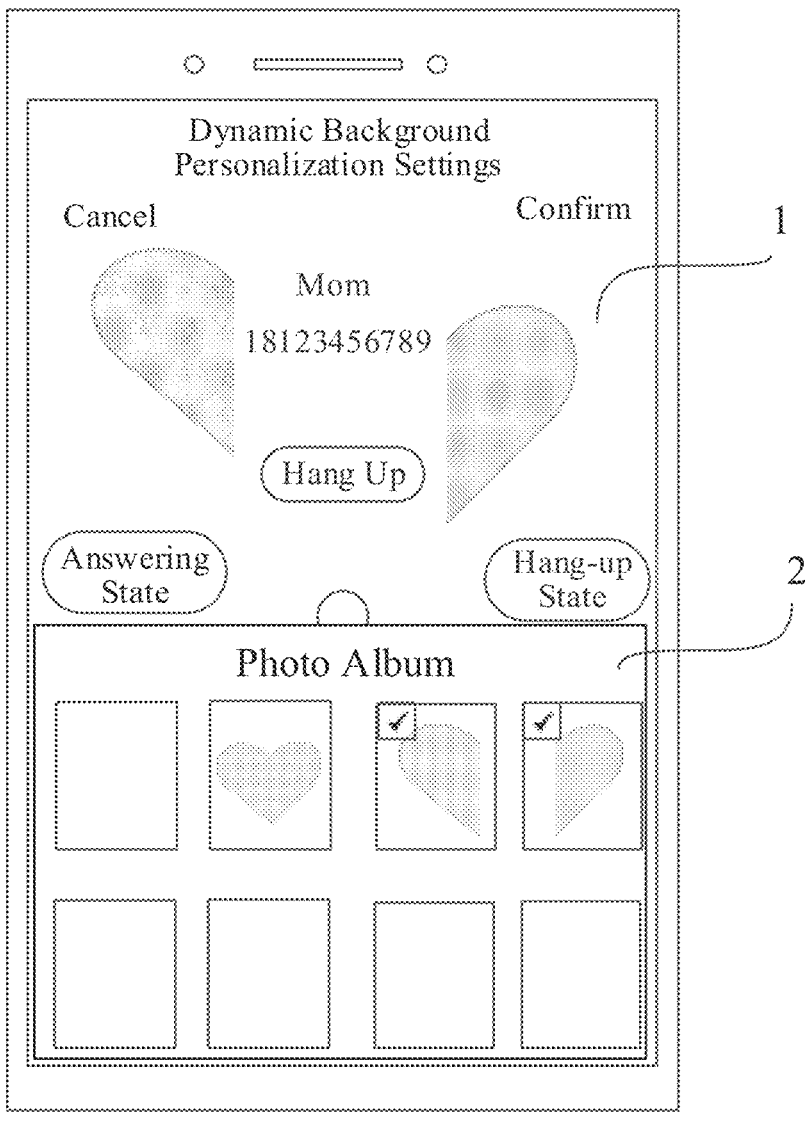
FIG. 6 is a fourth schematic diagram of a custom interface for incoming call display according to an embodiment of this application.

As an example, as shown in FIG. 6, the first interface includes a graphic editing area 1 and a graphic selection area 2. The graphic selection area includes N images to be selected, and the graphic editing area is used to define the second effect or the third effect.

Figure 3:
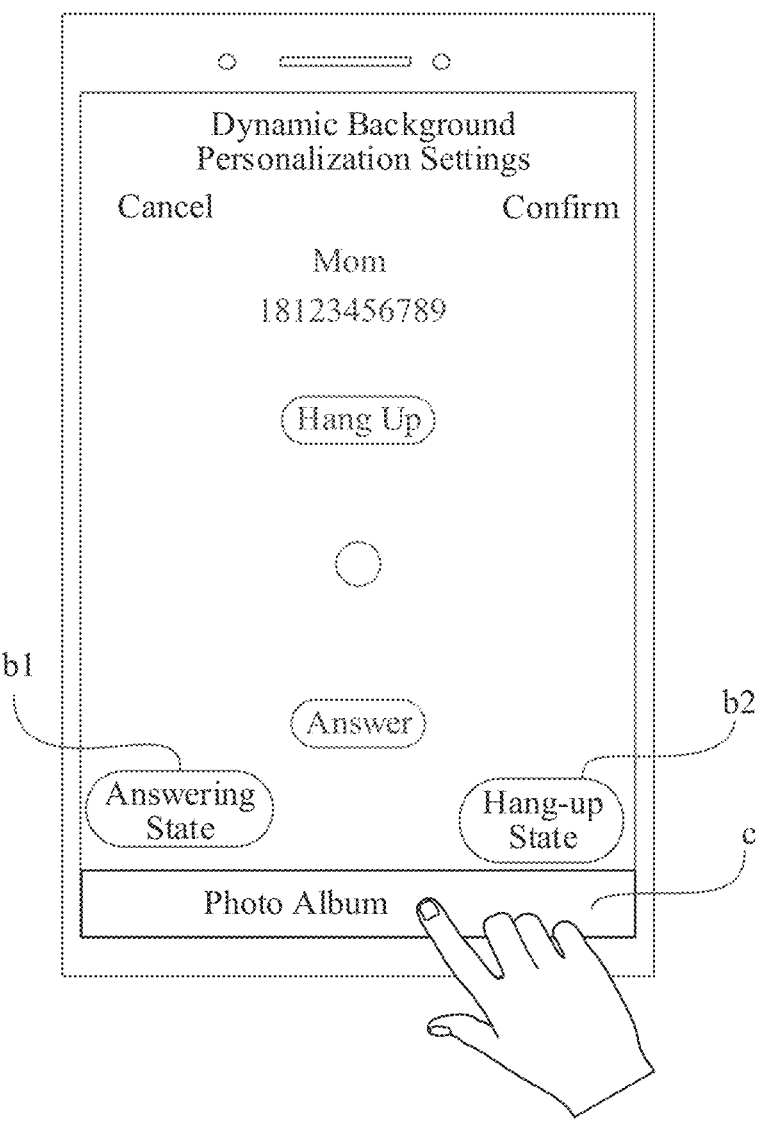
FIG. 3 is a first schematic diagram of a custom interface for incoming call display according to an embodiment of this application.

For example, as shown in FIG. 3, the first control is the "Answering State" button b1 for setting the incoming call display interface where incoming calls are answered, or the "Hang-up State" button b2 for setting the incoming call display interface where incoming calls are rejected.

The second input is a preset input, which can include but is not limited to at least one of tapping input, pressing input, press-and-hold input, pinching input, dragging input, sliding input, and swiping input, that is, the second input can be one of the above inputs, or a combination input of two or more of the above inputs. For example, the second input can be a selection input for the first image, such as tapping, double-tapping, and pressing; or the second input can alternatively be a dragging input after the first image is selected, such as dragging the first image from the graphic selection area 2 to the graphic editing area 1.

As an implementation, before the receiving a second input for a first image in N images displayed on the first interface, the method further includes: receiving an input operation for the album call entrance displayed on the first interface (such as the album c in FIG. 4); and in response to the input operation, displaying N images on the first interface. During the editing process of the target element, the album can be called up to perform various operations on compositions of the target element, such as adding or deleting.

As another implementation, in response to the operation of receiving an input operation from a user for the first control, displaying N images on the first interface.

In this embodiment, by displaying N images on the first interface and responding to the second input for the first image in the N images, displaying the first image on the first interface, it is possible to realize the selection of the target element displayed on the incoming call display interface, and the operation is editable.

Further, to facilitate the user to set the second effect and the third effect of the target element, in the first interface, the original icons in the incoming call display interface are displayed in a faded manner (as shown in FIGS. 3 to 6), so that the user can use the faded icons as display position markers to set the second effect and the third effect.

In one embodiment, after the displaying a first image on a first interface and before the receiving a first input from a user, the method further includes:

receiving a third input for the first image; and in response to the third input, adjusting the first image to a first target effect; where, in a case that the first control indicates setting the incoming call display interface where incoming calls are answered, the first target effect is the second effect; and in a case that the first control indicates setting the incoming call display interface where incoming calls are rejected, the first target effect is the third effect.

Figure 4:
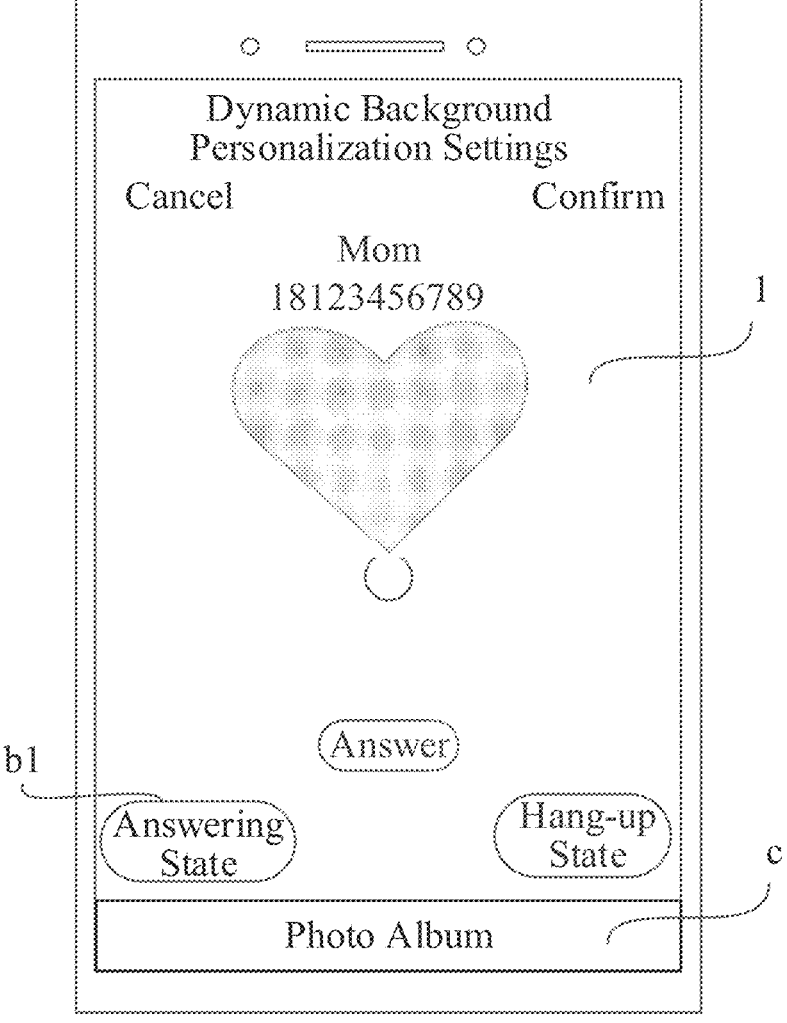
FIG. 4 is a second schematic diagram of a custom interface for incoming call display according to an embodiment of this application.
Figure 5:
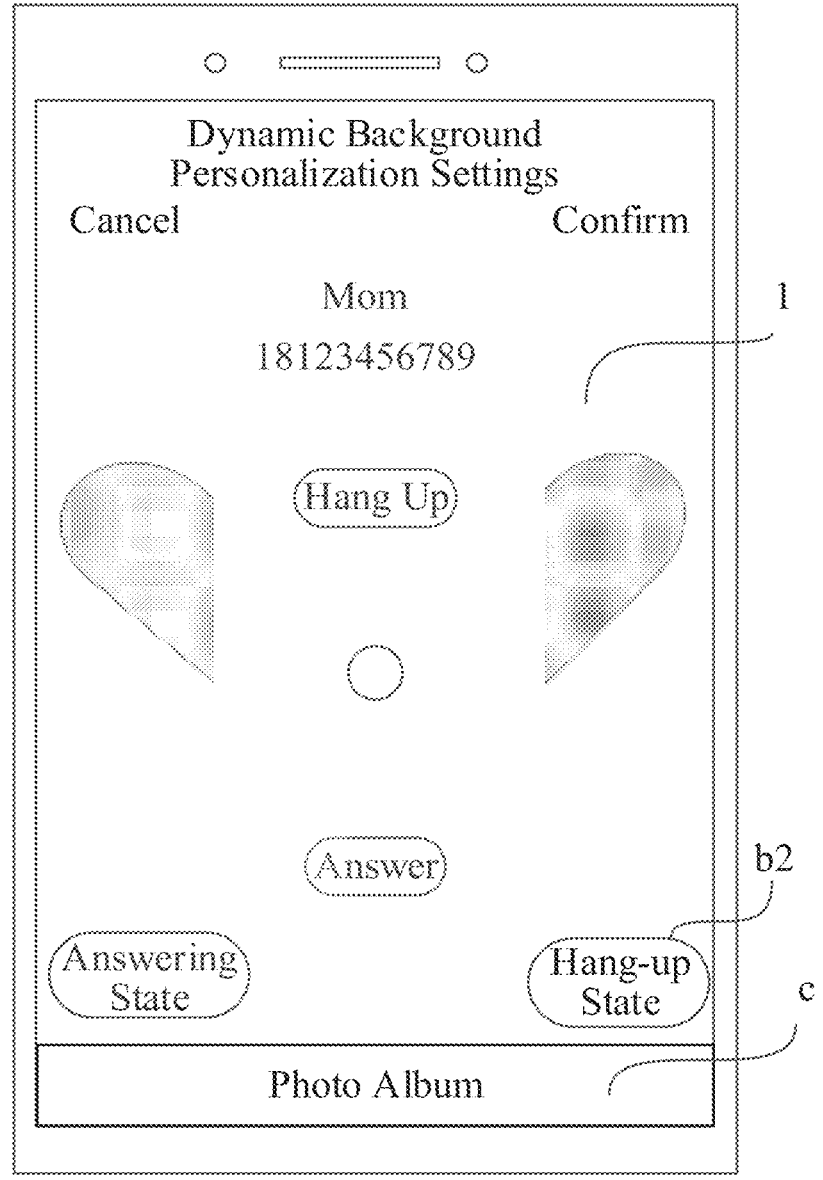
FIG. 5 is a third schematic diagram of a custom interface for incoming call display according to an embodiment of this application.

For example, as shown in FIGS. 4 to 6 in the graphic editing area 1, the user can edit the display position, color, shape size, and so on, of the first image; where, the fourth input is a preset input, which can include, but is not limited to, at least one of tapping input, pressing input, press-andhold input, pinching input, dragging input, sliding input, and swiping input, that is, the fourth input can be one of the above inputs, or a combination input of two or more of the above inputs. For instance, the position of the first image can be changed through a dragging operation, or the first image can be scaled and rotated using a two-finger gesture. This facilitates the user to adjust and set the second effect and the third effect of the target element.

In one embodiment, the first interface further includes a second control, the second control is used for indicating setting the incoming call display interface where incoming calls are answered or rejected, and content indicated by the second control is different from that of the first control; further, after the adjusting the first image to a first target effect, the method further includes:

in a case that an input for the second control is received, receiving a fourth input for the first image; and in response to the fourth input, adjusting the first image to a second target effect; where, in a case that the second control indicates setting the incoming call display interface where incoming calls are answered, the second target effect is the second effect; and in a case that the second control indicates setting the incoming call display interface where incoming calls are rejected, the second target effect is the third effect.

For example, as shown in FIG. 3, the first control is the "Answering State" button b1 for setting the incoming call display interface where incoming calls are answered, and the second control is the "Hang-up State" button b2 for setting the incoming call display interface where incoming calls are rejected.

In the above embodiments, when the first control is used to indicate setting the incoming call display interface where incoming calls are answered, the second control is used to indicate setting the incoming call display interface where incoming calls are rejected; when the first control is used to indicate setting the incoming call display interface where incoming calls are rejected, the second control is used to indicate setting the incoming call display interface where incoming calls are answered. Thus, after setting of the incoming call display interface for the first state (answering state or hang-up state) is completed, the third control can be used to enter the setting of the incoming call display interface for the second state, allowing the user to switch between setting of the incoming call display interface for the answering state and setting of the incoming call display interface for the hang-up state by tapping the first and second controls.

In one embodiment, the first interface further includes a third control, the third control is used for indicating setting the incoming call display interface where incoming calls are answered or rejected, and content indicated by the third control is different from that of the first control;

That is, when the first control is used to indicate setting the incoming call display interface where incoming calls are answered, the third control is used to indicate setting the incoming call display interface where incoming calls are rejected; when the first control is used to indicate setting the incoming call display interface where incoming calls are rejected, the third control is used to indicate setting the incoming call display interface where incoming calls are answered. Thus, the user can switch between the incoming call display interface for the answering state and the incoming call display interface for the hang-up state by tapping the first and third controls.

Further, after the first image is displayed on the first interface and before the target element is displayed on the incoming call display interface, the method further includes:

in a case that an input for the third control is received, receiving a fifth input for a second image in M images displayed on the first interface; and in response to the fifth input, displaying the second image on the first interface, where the target element corresponds to the second image.

As an implementation, before the receiving a fifth input for a second image in M images displayed on the first interface, the method further includes: receiving an input operation for the album call entrance displayed on the first interface; and in response to the input operation, displaying M images on the first interface. During the editing process of the target element, the album can be called up to perform various operations on compositions of the target element, such as adding or deleting.

As another implementation, in response to receiving an input operation by a user for the third control, M images are displayed on the first interface.

For example, the fifth input can be a selection input for the second image, such as tapping, double-tapping, and pressing; or the fifth input can alternatively be a dragging input after the second image is selected, such as dragging the second image from the graphic selection area 2 to the graphic editing area 1, to replace the first image displayed on the first interface with the second image.

It should be noted that in a case that the target element in the incoming call display interface in the answering state is replaced with the second image, the target element in the incoming call display interface in the hang-up state is also replaced with the second image by default, and the display position of the second image is the same as that of the first image; after the target element in the incoming call display interface in the hang-up state is replaced with the second image, the target element in the incoming call display interface in the answering state is also replaced with the second image, and the display position of the second image is the same as that of the first image.

In this embodiment, after setting of the incoming call display interface in a first state of the two states (answering state and hang-up state) is completed, the third control can be used to enter the setting of the incoming call display interface in a second state, and during the setting process, the fifth input can be used to replace the selected first image with the second image, making the second image the target element displayed on the incoming call display interface, facilitating the user's operation.

Further, after the "Confirm" or "Cancel" button on the first interface is tapped, the current editing is completed or the current editing is canceled, respectively.

In one embodiment, the first interface corresponds to a target contact category, and a contact corresponding to the incoming call display interface belongs to the target contact category.

In this embodiment, the first interface is associated with the target contact category (such as family, colleagues, leaders, clients, merchants, service providers, intermediaries, maintenance personal, and temporary contacts), that is, different target elements, first effects, second effects, and third effects can be set for different contact categories.

Optionally, the first interface can correspond to a target contact under the target contact category (such as mom in the family category), then after the second effect or third effect is set for the target incoming call display interface, the second effect or third effect is applied to a target contact under the target contact category (such as dad in the family category).

In one embodiment, the method further includes:

controlling display tones of the first effect, second effect, and third effect according to a contact frequency between the incoming call contact and the user.

In this embodiment, the contact frequency can be pre-divided into different intimacy levels, the number of levels can be set as needed, and different numerical ranges correspond to different intimacy levels. Different tones are used to distinguish different intimacy levels, thereby achieving a fine distinction of contacts. For example, the warmer the tone, the higher the intimacy level between the incoming call contact and the user, and the colder the tone, the lower the intimacy level between the incoming call contact and the user.

The third input is a preset input, and the third input may include but is not limited to at least one of tapping input, pressing input, press-and-hold input, pinching input, dragging input, sliding input, and swiping input, that is, the third input can be one of the above inputs, or a combination input of two or more of the above inputs.

In one embodiment, before the receiving a first input from a user, the method further includes:

in a case that an incoming call is received, controlling a target element of the incoming call display interface to move according to a preset rule; such as making small regular movements within a fixed range to achieve a better visual experience.

The embodiments of this application can realize deep customization of personalized animation operations for incoming call backgrounds, meeting the growing personalized needs of users, and enhancing the emotional experience of users on the incoming call answering page. Moreover, users can customize the number of graphics and animation effects, and with different graphics, a rich answering experience can be achieved. In addition, users can set different effects for different contacts, realizing a deeply customized personalized experience, enriching the user's choices. The graphics respond to the user's interactive actions, combining with the functions of the incoming call page, giving new connotations to the graphics of the animated background.

The method for processing an incoming call display interface provided by the embodiments of this application can be executed by an apparatus for processing an incoming call display interface. In the embodiments of this application, the apparatus for processing an incoming call display interface executing the method for processing an incoming call display interface is used as an example to illustrate the apparatus for processing an incoming call display interface provided by the embodiments of this application.

Figure 10:
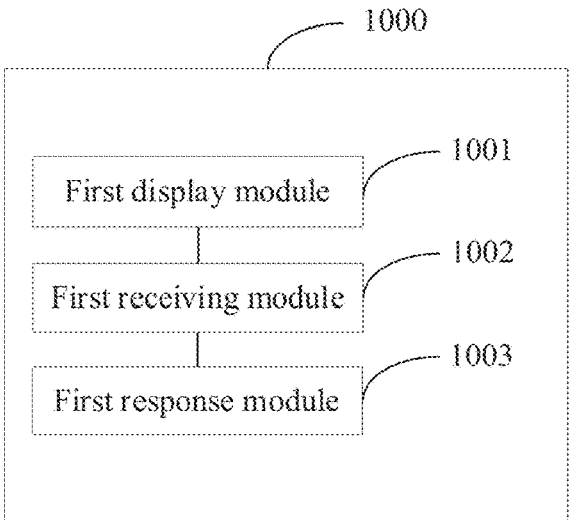
FIG. 10 is a block diagram of an apparatus for processing an incoming call display interface according to an embodiment of this application.

As shown in FIG. 10, this application provides an apparatus 1000 for processing an incoming call display interface, including:

a first display module 1001 configured to display an incoming call display interface, where the incoming call display interface includes a target element, and the target element is displayed with a first effect;

a first receiving module 1002 configured to receive a first input from a user; and a first response module 1003 configured to: in response to the first input, display the target element with a second effect in a case that the first input indicates answering an incoming call, and display the target element with a third effect in a case that the first input indicates rejecting an incoming call.

Optionally, the apparatus 1000 further includes:

a second display module configured to display a first interface, where the first interface is used for setting the incoming call display interface, the first interface includes a first control, and the first control is used for indicating setting the incoming call display interface where incoming calls are answered or rejected;

a second receiving module configured to, in a case that an input for the first control is received, receive a second input for a first image in N images displayed on the first interface; and a second response module configured to, in response to the second input, display the first image on the first interface, where the target element corresponds to the first image.

Optionally, the apparatus 1000 further includes:

a third receiving module configured to receive a third input for the first image; and a third response module configured to, in response to the third input, adjust the first image to a first target effect.

In a case that the first control indicates setting the incoming call display interface where incoming calls are answered, the first target effect is the second effect.

In a case that the first control indicates setting the incoming call display interface where incoming calls are rejected, the first target effect is the third effect.

Optionally, the first interface further includes a second control, the second control is used for indicating setting the incoming call display interface where incoming calls are answered or rejected, and content indicated by the second control is different from that of the first control.

The apparatus 1000 further includes:

a fourth receiving module configured to, in a case that an input for the second control is received, receive a fourth input for the first image; and a fourth response module configured to, in response to the fourth input, adjust the first image to a second target effect.

In a case that the second control indicates setting the incoming call display interface where incoming calls are answered, the second target effect is the second effect.

In a case that the second control indicates setting the incoming call display interface where incoming calls are rejected, the second target effect is the third effect.

Optionally, the first interface further includes a third control, the third control is used for indicating setting the incoming call display interface where incoming calls are answered or rejected, and content indicated by the third control is different from that of the first control;

The apparatus 1000 further includes:

a fifth receiving module configured to, in a case that an input for the third control is received, receive a fifth input for a second image in M images displayed on the first interface; and a fifth response module configured to, in response to the fifth input, display the second image on the first interface, where the target element corresponds to the second image.

Optionally, the first interface corresponds to a target contact category, and a contact corresponding to the incoming call display interface belongs to the target contact category.

The foregoing apparatus 1000 for processing an incoming call display interface of this application can realize deep customization of personalized animation operations for incoming call backgrounds, meeting the growing personalized needs of users, and enhancing the emotional experience of users on the incoming call answering page. Moreover, users can customize the number of graphics and animation effects, and with different graphics, a rich answering experience can be achieved. In addition, users can set different effects for different contacts, realizing a deeply customized personalized experience, enriching the user's choices. The graphics respond to the user's interactive actions, combining with the functions of the incoming call page, giving new connotations to the graphics of the animated background.

The apparatus for processing an incoming call display interface in the embodiments of this application can be an electronic device or a component of an electronic device, such as an integrated circuit or chip. The electronic device can be a terminal, or another device other than the terminal. For example, the electronic device may be a mobile phone, a tablet computer, a notebook computer, a palmtop computer, a vehicle-mounted electronic device, a mobile Internet device (MID), an augmented reality (AR)/virtual reality (VR) device, a robot, a wearable device, an ultra-mobile personal computer (UMPC), a netbook, or a personal digital assistant (PDA), and the like, and may alternatively be a server, a network attached storage (NAS), a personal computer (PC), a television (TV), a teller machine, a self-service machine, or the like. This is not specifically limited in the embodiments of this application.

The apparatus for processing an incoming call display interface in this embodiment of this application may be an apparatus having an operating system. The operating system may be an android operating system, an iOS operating system, or another possible operating system. This is not specifically limited in the embodiments of this application.

The signal processing apparatus provided in an embodiment of this application can implement the processes implemented in the embodiments of the apparatus for processing an incoming call display interface in FIG. 1 to FIG. 9. To avoid repetition, details are not described now.

Optionally, as shown in FIG. 11, an embodiment of this application also provides an electronic device 1100 including a processor 1101, a memory 1102, and a program or instructions stored in the memory 1102 and executable on the processor 1101. When the program or instructions are executed by the processor 1101, the processes in the foregoing embodiments of the method for processing an incoming call display interface are implemented with the same technical effects achieved. To avoid repetition, details are not further described now.

It should be noted that the electronic device in an embodiment of this application includes the foregoing mobile electronic device and non-mobile electronic device.

FIG. 12 is a schematic diagram of a hardware structure of an electronic device according to an embodiment of this application.

The electronic device 1200 includes but is not limited to components such as a radio frequency unit 1201, a network module 1202, an audio output unit 1203, an input unit 1204, a sensor 1205, a display unit 1206, a user input unit 1207, an interface unit 1208, a memory 1209, and a processor 1210.

It can be understood by those skilled in the art that the electronic device 1200 may further include a power supply (for example, a battery) supplying power to the components. The power supply may be logically connected to the processor 1210 via a power management system, so that functions such as charge management, discharge management, and power consumption management are implemented via the power management system. The structure of the electronic device shown in FIG. 12 does not constitute a limitation on the electronic device. The electronic device may include more or fewer components than shown in the drawing, or combine some of the components, or arrange the components differently. Details are not described herein.

The display unit 1206 is configured to display the incoming call display interface, where the incoming call display interface includes a target element, and the target element is displayed with a first effect.

The user input unit 1207 is configured to receive the first input from a user.

The processor 1210 is configured to: in response to the first input, display the target element with a second effect in a case that the first input indicates answering an incoming call, and display the target element with a third effect in a case that the first input indicates rejecting an incoming call.

In this embodiment, by displaying the incoming call display interface that includes a target element displayed with a first effect; receiving a first input from a user; and in response to the first input, displaying the target element with a second effect in a case that the first input indicates answering an incoming call, and displaying the target element with a third effect in a case that the first input indicates rejecting an incoming call, it is possible to enrich the display effect of the incoming call background and add interest.

Optionally, before displaying the incoming call display interface, the display unit 1206 is further configured to display a first interface, where the first interface is used for setting the incoming call display interface, the first interface includes a first control, and the first control is used for indicating setting the incoming call display interface where incoming calls are answered or rejected;

the user input unit 1207 is further configured to, in a case that an input for the first control is received, receive a second input for a first image in N images displayed on the first interface; and the display unit 1206 is further configured to, in response to the second input, display the first image on the first interface, where the target element corresponds to the first image.

Optionally, after the first image is displayed on a first interface and before the first input from a user is received, the user input unit 1207 is further configured to receive a third input for the first image; and the display unit 1206 is further configured to, in response to the third input, adjust the first image to a first target effect; where, in a case that the first control indicates setting the incoming call display interface where incoming calls are answered, the first target effect is the second effect; and in a case that the first control indicates setting the incoming call display interface where incoming calls are rejected, the first target effect is the third effect.

Optionally, the first interface further includes a second control, the second control is used for indicating setting the incoming call display interface where incoming calls are answered or rejected, and content indicated by the second control is different from that of the first control;

after the first image is adjusted to the first target effect, the user input unit 1207 is further configured to, in a case that an input for the second control is received, receive a fourth input for the first image; and the display unit 1206 is further configured to, in response to the fourth input, adjust the first image to a second target effect; where, in a case that the second control indicates setting the incoming call display interface where incoming calls are answered, the second target effect is the second effect; and in a case that the second control indicates setting the incoming call display interface where incoming calls are rejected, the second target effect is the third effect.

Optionally, the first interface further includes a third control, the third control is used for indicating setting the incoming call display interface where incoming calls are answered or rejected, and content indicated by the third control is different from that of the first control;

after the first image is displayed on the first interface and before the target element is displayed on the incoming call display interface, the user input unit 1207 is further configured to, in a case that an input for the third control is received, receive a fifth input for a second image in M images displayed on the first interface; and the display unit 1206 is further configured to, in response to the fifth input, display the second image on the first interface, where the target element corresponds to the second image.

Optionally, the first interface corresponds to a target contact category, and a contact corresponding to the incoming call display interface belongs to the target contact category.

The above electronic device 1200 according to this application can realize deep customization of personalized animation operations for incoming call backgrounds, meeting the growing personalized needs of users, and enhancing the emotional experience of users on the incoming call answering page. Moreover, users can customize the number of graphics and animation effects, and with different graphics, a rich answering experience can be achieved. In addition, users can set different effects for different contacts, realizing a deeply customized personalized experience, enriching the user's choices. The graphics respond to the user's interactive actions, combining with the functions of the incoming call page, giving new connotations to the graphics of the animated background.

It should be understood that in an embodiment of this application, the input unit 1204 may include a graphics processing unit (GPU) 12041 and a microphone 12042. The graphics processing unit 12041 processes image data of a static picture or a video obtained by an image capture apparatus (such as a camera) in a video capture mode or an image capture mode. The display unit 1206 may include a display panel 12061. The display panel 12061 may be configured in a form of a liquid crystal display, an organic light-emitting diode display, or the like. The user input unit 1207 includes at least one of a touch panel 12071 and other input devices 12072. The touch panel 12071 is also referred to as a touchscreen. The touch panel 12071 may include two parts: a touch detection apparatus and a touch controller. The other input devices 12072 may include but is not limited to a physical keyboard, a function button (such as a volume control button or a power button), a trackball, a mouse, and a joystick. Details are not described now.

The memory 1209 may be configured to store a software program and various data. The memory 1209 may mainly include a first storage area storing a program or instructions and a second storage area storage data. The first storage area may store an operating system, an application program or instructions required by at least one function (for example, sound play function or image play function), and the like. The memory 1209 may include a volatile memory or a non-volatile memory, or may include a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), a static RAM (SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synch link DRAM, SLDRAM), and a direct rambus random access memory (Direct Rambus RAM, DRRAM). The memory 1209 described in the embodiments of this application is intended to include but is not limited to these and any other suitable types of memories.

The processor 1210 may include one or more processing units. Optionally, the processor 1210 may integrate an application processor and a modem processor. The application processor mainly processes an operating system, a user interface, an application program, and the like. The modem processor mainly processes wireless communication signals, such as a baseband processor. It can be understood that a modem processor may alternatively skip being integrated in the processor 1210.

An embodiment of this application also provides a readable storage medium having a program or instructions stored thereon. When the program or instructions are executed by the processor, the processes in the foregoing embodiments of the method for processing an incoming call display interface are implemented with the same technical effects achieved. To avoid repetition, details are not further described now.

The processor is the processor in the electronic device in the foregoing embodiments. The readable storage medium includes a computer-readable storage medium such as a computer read-only memory ROM, a random access memory RAM, a magnetic disk, or an optical disc.

An embodiment of this application also provides a chip including a processor and a communication interface. The communication interface is coupled with the processor, and the processor is configured to execute the program or instructions to implement the processes in the foregoing embodiments of the method for processing an incoming call display interface with the same technical effects achieved. To avoid repetition, details are not further described now.

It should be understood that the chip mentioned in an embodiment of this application may also be referred to as a system-level chip, a system chip, a chip system, a system-on-chip, or the like.

An embodiment of this application further provides a computer program product, where the program product is stored in a storage medium, and the program product is executed by at least one processor to implement the processes of the foregoing embodiments of the method for processing an incoming call display interface, with the same technical effects achieved. To avoid repetition, details are not described herein again.

It should be noted that in this specification, the terms "comprise" and "include", or any of their variants are intended to cover a non-exclusive inclusion, such that a process, method, article, or apparatus that includes a series of elements includes not only those elements but also other elements that are not expressly listed, or further includes elements inherent to such process, method, article, or apparatus. Without more restrictions, an element preceded by the statement "includes a . . . " does not preclude the presence of other identical elements in the process, method, article, or apparatus that includes the element. Furthermore, it should be noted that the scope of the method and apparatus in the embodiments of this application is not limited to performing the functions in the order shown or discussed, but may also include performing the functions in a substantially simultaneous manner or in a reverse order depending on the functions involved. For example, the described method may be performed in an order different from the order described, and steps may be added, omitted, or combined. In addition, features described with reference to some examples may be combined in other examples.

According to the description of the foregoing embodiments, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is an example embodiment. Based on such an understanding, the technical solutions of this application essentially, or the part contributing to the prior art may be implemented in a form of a computer software product. The computer software product is stored in a storage medium (for example, a ROM/RAM, a magnetic disk, or an optical disc), and includes several instructions for instructing a terminal (which may be a mobile phone, a computer, a server, a network device, or the like) to perform the method described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other forms without departing from the principle of this application and the protection scope of the claims, and all such forms fall within the protection scope of this application.

What is claimed is:

1. A method for processing an incoming call display interface, comprising:

displaying an incoming call display interface, wherein the incoming call display interface comprises a target element, and the target element is displayed with a first effect;

receiving a first input from a user; and in response to the first input, displaying the target element with a second effect in a case that the first input indicates answering an incoming call, and displaying the target element with a third effect in a case that the first input indicates rejecting an incoming call;

wherein before the displaying an incoming call display interface, the method further comprises:

displaying a first interface, wherein the first interface is used for setting the incoming call display interface, the first interface comprises a first control, and the first control is used for indicating setting the incoming call display interface where incoming calls are answered or rejected;

in a case that an input for the first control is received, receiving a second input for a first image in N images displayed on the first interface; and in response to the second input, displaying the first image on the first interface, wherein the target element corresponds to the first image.

2. The method for processing an incoming call display interface according to claim 1, wherein after the displaying a first image on a first interface and before the receiving a first input from a user, the method further comprises:

receiving a third input for the first image; and in response to the third input, adjusting the first image to a first target effect; wherein in a case that the first control indicates setting the incoming call display interface where incoming calls are answered, the first target effect is the second effect; and in a case that the first control indicates setting the incoming call display interface where incoming calls are rejected, the first target effect is the third effect.

3. The method for processing an incoming call display interface according to claim 2, wherein the first interface further comprises a second control, the second control is used for indicating setting the incoming call display interface where incoming calls are answered or rejected, and content indicated by the second control is different from that of the first control; and after the adjusting the first image to a first target effect, the method further comprises:

in a case that an input for the second control is received, receiving a fourth input for the first image; and in response to the fourth input, adjusting the first image to a second target effect; wherein in a case that the second control indicates setting the incoming call display interface where incoming calls are answered, the second target effect is the second effect; and in a case that the second control indicates setting the incoming call display interface where incoming calls are rejected, the second target effect is the third effect.

4. The method for processing an incoming call display interface according to claim 1, wherein the first interface further comprises a third control, the third control is used for indicating setting the incoming call display interface where incoming calls are answered or rejected, and content indicated by the third control is different from that of the first control; and after the first image is displayed on the first interface and before the target element is displayed on the incoming call display interface, the method further comprises:

in a case that an input for the third control is received, receiving a fifth input for a second image in M images displayed on the first interface; and in response to the fifth input, displaying the second image on the first interface, wherein the target element corresponds to the second image.

5. The method for processing an incoming call display interface according to claim 1, wherein the first interface corresponds to a target contact category, and a contact corresponding to the incoming call display interface belongs to the target contact category.

6. A chip, comprising a processor and a communication interface, wherein the communication interface is coupled to the processor, and the processor is configured to execute a program or instructions to implement the steps of the methods according to claim 1.

7. A computer program product, wherein the computer program product is stored in a storage medium, and the computer program product is executed by at least one processor to implement the steps of the methods according to claim 1.

8. An electronic device, comprising a processor and a memory, wherein the memory stores a program or instructions capable of running on the processor, wherein the program or instructions, when executed by the processor, causes the electronic device to perform:

displaying an incoming call display interface, wherein the incoming call display interface comprises a target element, and the target element is displayed with a first effect;

receiving a first input from a user; and in response to the first input, displaying the target element with a second effect in a case that the first input indicates answering an incoming call, and displaying the target element with a third effect in a case that the first input indicates rejecting an incoming call;

wherein before displaying an incoming call display interface, the program or instructions, when executed by the processor, causes the electronic device to further perform:

displaying a first interface, wherein the first interface is used for setting the incoming call display interface, the first interface comprises a first control, and the first control is used for indicating setting the incoming call display interface where incoming calls are answered or rejected;

in a case that an input for the first control is received, receiving a second input for a first image in N images displayed on the first interface; and in response to the second input, displaying the first image on the first interface, wherein the target element corresponds to the first image.

9. The electronic device according to claim 8, wherein after displaying a first image on a first interface and before the receiving a first input from a user, the program or instructions, when executed by the processor, causes the electronic device to further perform:

receiving a third input for the first image; and in response to the third input, adjusting the first image to a first target effect; wherein in a case that the first control indicates setting the incoming call display interface where incoming calls are answered, the first target effect is the second effect; and in a case that the first control indicates setting the incoming call display interface where incoming calls are rejected, the first target effect is the third effect.

10. The electronic device according to claim 9, wherein the first interface further comprises a second control, the second control is used for indicating setting the incoming call display interface where incoming calls are answered or rejected, and content indicated by the second control is different from that of the first control; and after adjusting the first image to a first target effect, the program or instructions, when executed by the processor, causes the electronic device to further perform:

in a case that an input for the second control is received, receiving a fourth input for the first image; and in response to the fourth input, adjusting the first image to a second target effect; wherein in a case that the second control indicates setting the incoming call display interface where incoming calls are answered, the second target effect is the second effect; and in a case that the second control indicates setting the incoming call display interface where incoming calls are rejected, the second target effect is the third effect.

11. The electronic device according to claim 8, wherein the first interface further comprises a third control, the third control is used for indicating setting the incoming call display interface where incoming calls are answered or rejected, and content indicated by the third control is different from that of the first control; and after the first image is displayed on the first interface and before the target element is displayed on the incoming call display interface, the program or instructions, when executed by the processor, causes the electronic device to further perform:

in a case that an input for the third control is received, receiving a fifth input for a second image in M images displayed on the first interface; and in response to the fifth input, displaying the second image on the first interface, wherein the target element corresponds to the second image.

12. The electronic device according to claim 8, wherein the first interface corresponds to a target contact category, and a contact corresponding to the incoming call display interface belongs to the target contact category.

13. A non-transitory readable storage medium, wherein the non-transitory readable storage medium stores a program or instructions, wherein the program or instructions, when executed by a processor of an electronic device, causes the electronic device to perform:

displaying an incoming call display interface, wherein the incoming call display interface comprises a target element, and the target element is displayed with a first effect;

receiving a first input from a user; and in response to the first input, displaying the target element with a second effect in a case that the first input indicates answering an incoming call, and displaying the target element with a third effect in a case that the first input indicates rejecting an incoming call;

wherein before displaying an incoming call display interface, the program or instructions, when executed by the processor of the electronic device, causes the electronic device to further perform:

displaying a first interface, wherein the first interface is used for setting the incoming call display interface, the first interface comprises a first control, and the first control is used for indicating setting the incoming call display interface where incoming calls are answered or rejected;

in a case that an input for the first control is received, receiving a second input for a first image in N images displayed on the first interface; and in response to the second input, displaying the first image on the first interface, wherein the target element corresponds to the first image.

14. The non-transitory readable storage medium according to claim 13, wherein after displaying a first image on a first interface and before the receiving a first input from a user, the program or instructions, when executed by the processor of the electronic device, causes the electronic device to further perform:

receiving a third input for the first image; and in response to the third input, adjusting the first image to a first target effect; wherein in a case that the first control indicates setting the incoming call display interface where incoming calls are answered, the first target effect is the second effect; and in a case that the first control indicates setting the incoming call display interface where incoming calls are rejected, the first target effect is the third effect.

15. The non-transitory readable storage medium according to claim 14, wherein the first interface further comprises a second control, the second control is used for indicating setting the incoming call display interface where incoming calls are answered or rejected, and content indicated by the second control is different from that of the first control; and after adjusting the first image to a first target effect, the program or instructions, when executed by the processor of the electronic device, causes the electronic device to further perform:

in a case that an input for the second control is received, receiving a fourth input for the first image; and in response to the fourth input, adjusting the first image to a second target effect; wherein in a case that the second control indicates setting the incoming call display interface where incoming calls are answered, the second target effect is the second effect; and in a case that the second control indicates setting the incoming call display interface where incoming calls are rejected, the second target effect is the third effect.

16. The non-transitory readable storage medium according to claim 13, wherein the first interface further comprises a third control, the third control is used for indicating setting the incoming call display interface where incoming calls are answered or rejected, and content indicated by the third control is different from that of the first control; and after the first image is displayed on the first interface and before the target element is displayed on the incoming call display interface, the program or instructions, when executed by the processor of the electronic device, causes the electronic device to further perform:

in a case that an input for the third control is received, receiving a fifth input for a second image in M images displayed on the first interface; and in response to the fifth input, displaying the second image on the first interface, wherein the target element corresponds to the second image.

17. The non-transitory readable storage medium according to claim 13, wherein the first interface corresponds to a target contact category, and a contact corresponding to the incoming call display interface belongs to the target contact category.

* * * * *